United States Patent [19]

Cheng

[11] Patent Number: 5,540,057
[45] Date of Patent: Jul. 30, 1996

[54] VOLATILE ORGANIC COMPOUNDS RECOVERY FROM VENT GAS STREAMS

[75] Inventor: Alan T. Y. Cheng, Livingston, N.J.

[73] Assignee: Praxair Technology, Inc., Danbury, Conn.

[21] Appl. No.: 497,656

[22] Filed: Jun. 30, 1995

[51] Int. Cl.$^6$ ............................................. F25J 3/00
[52] U.S. Cl. ......................... 62/625; 62/632; 62/903
[58] Field of Search ................................. 62/9, 11, 20

[56] References Cited

U.S. PATENT DOCUMENTS

| 4,464,904 | 8/1984 | Steigman | 62/52 |
| 4,769,054 | 9/1988 | Steigman | 62/12 |
| 5,150,576 | 9/1992 | Minzenberger | 62/11 |
| 5,261,250 | 11/1993 | Missimer | 62/9 |
| 5,345,772 | 9/1994 | Hopewell | 62/20 |
| 5,367,881 | 11/1994 | Henzler | 62/11 |

*Primary Examiner*—Ronald C. Capossela
*Attorney, Agent, or Firm*—Alvin H. Fritschler

[57] ABSTRACT

A vent gas stream containing volatile organic compounds is passed continuously through a condenser in counter-current flow with respect to cold clean vent gas combined with a cryogenic refrigerant. The volatile organic compounds are condensed at various temperatures inside the condenser, and are separately recovered at very low levels of refrigerant utilization.

11 Claims, 3 Drawing Sheets

VOLATILE ORGANIC COMPOUNDS RECOVERY FROM VENT GAS STREAMS

BACKGROUND OF THE INVENTION

1. Field of the Invention

The invention relates to the recovery of volatile organic compounds. More particularly, it relates to the improved recovery of such volatile organic compounds from vent gas streams.

2. Description of the Prior Art

It is well known that many industrial operations utilize volatile organic compounds (VOCs), including a variety of manufacturing, chemical production and petroleum refining operations. Generally, existing industrial processes and systems are equipped to capture a fraction of these VOCs, either for reuse within the process or for destruction. Some VOCs inevitably leave the process, however, and pass into the environment as a result of air emissions, waste water discharges, solid residue discards, and the like. The VOCs are usually present in relatively low concentrations in such waste streams removed from the industrial process.

As a result of heightened environmental awareness on the part of industry and the general public, recent legislation in many countries due to such environmental awareness, as well as economic penalties associated with the loss of valuable feedstock or product, there is an increased need to maximize the recovery of VOCs from dilute process streams. For example, the Clean Air Act Amendments of 1990 in the United States of America require a 90% reduction in emissions of 189 toxic chemicals by the year 2000. About 70% of these toxic chemicals can be properly classified as VOCs. The cost of implementing the required Maximum Achievable Control Technology (MACT) requirements is estimated to be in the billions of dollars.

Several technologies are commercially available for controlling volatile organic compounds. For example, vent gas condensation using cryogenic fluid or mechanically chilled refrigerant provides both the benefits of minimum emissions and solvent recovery. Adsorption processes using activated carbon or molecular sieves can be employed, but involve relatively complicated regeneration procedures. Other techniques, such as thermal and catalytic incineration techniques can destroy the volatile completely, but do not provide recovery of organic material. As a result, vent gas condensation is the most desirable waste control technique, since the VOCs can be recovered and reused.

However, most solvent recovery units that use mechanical chillers, generally operating at between 0° and –40° C., can no longer meet stringent emission standards. To improve VOC recovery, conventional batch cryogenic condensers can be added onto existing mechanical chillers. Such conventional batch cryogenic condensers require a long defrosting cycle since the VOCs are frozen indiscriminately to a preset freezing temperature. Dual condensers are required to ensure uninterrupted operation. To recover the volatiles, such condensers freeze all of the volatiles, including water. With organic material and water ice forming in the condenser wall, the unit is then defrosted periodically. The defrosting cycle is relatively long, and cryogenic fluid consumption is very high.

Mechanical chillers, as indicated above, can be used to condense VOCs and are less expense to operate than cryogenic vent gas condensers, but the equipment required is more expensive. Furthermore, as also noted above, mechanically chilled condensers have restrictive temperature limits. Ammonia chillers can only reach –40° C. Freon chillers will likely be banned from commercial operations for environmental reasons. To meet the stiff emission requirements increasingly applicable for industrial applications, VOC recovery units capable of reaching lower operating temperatures are required. Mechanical chillers combined with presently available vent gas condensers provide a stopgap measure for satisfying emission control requirements. However, this approach is not economically attractive, since two separate pieces of equipment are needed to accomplish the required emission control task.

It should be noted that the operating efficiencies of batch condensers generally are rather poor. All batch condensers tend to have one preset temperature. At this preset temperature, a majority of the low boiling components of a vent stream will be condenses, but all of the high boiling components will be frozen. Frequent freezing and defrosting cycles consume excessive amounts of energy and refrigerant, with the refrigerant being spent to cool the defrosted condenser back to cryogenic temperatures. Reductions in the freezing-defrosting cycles would improve the economics of the VOC recovery process.

During the cooling cycle, batch condensers are also slow to recover waste refrigerant, due to the large imbalance in heat load. In a condensing vapor stream, more energy is spent on overcoming the heat of condensation and the heat of solidification, rather than in removing existing sensible heat. As the condensed liquid or frozen solid remains on the condenser surface, the exhausting clean vent gas has too little enthalpy to heat exchange with the incoming vent gas. Consequently, the incoming vent gas can usually be precooled only to a temperature far above the boiling point of the volatiles, e.g. methanol with a boiling point of 65° C. With sufficient thermal gradient, spent nitrogen would be vented at about 20° C. below the freezing point of the volatiles, e.g. methanol with a –98° C. melting point, so nitrogen would vent at –118° C.

As an alternative, an economizer can be used to recover waste refrigerant from a spent nitrogen stream. However, condensation or freezing generally are not allowed in economizers. The incoming vent gas can be pre-cooled only to a temperature above the boiling point of the volatile material. With excess heat load respecting the spent nitrogen, it is vented cold, e.g. at –20° C. No heat recovery can be performed with the exhausting clean vent gas, which is vented at the freezing point of the volatiles, e.g. at –118° C.

Batch cryogenic condensers also have significant disadvantages when handling gas streams containing multiple component volatiles. For example, water vapor can condense rapidly on the condenser coil. Because of the large heat of condensation and heat capacity available, a large volume of water vapor can temporarily stop the organic vapor from condensing, resulting in an undesired release of organic vapor to the atmosphere, As the cryogenic vapor catches-up with the temperature rise, the organic vapor starts to condense, but water starts to freeze. Under such circumstances, it is not long before the condenser systems loses its heat transfer capability, due to the presence of large blocks of ice in the coils of the condenser.

Under such existing circumstances, it will be appreciated that further developments are desired in the art to enable applicable clean air standards to be complied with in an efficient and economical manner. The development of a continuous vent gas condenser approach, not requiring dual operating units, would represent a significant advance in the art of vent gas control and recovery.

It is an object of the invention, therefore, to provide an improved method for recovering volatile organic compounds from vent gas streams.

It is another object of the invention to provide a continuous method for removing and recovering multiple organic volatiles from a vent gas stream.

It is a further object of the invention to provide a method for recovering organic components from vent gas streams so as to obviate the need for employing cryogenic condensers in combination with mechanical chillers for VOC recovery from vent gas steams.

With these and other object in mind, the invention is hereinafter described in detail, the novel features thereof being particularly pointed out in the appended claims.

SUMMARY OF THE INVENTION

Trace quantities of VOCs in vent gas streams are recovered and recycled using counter-current heat exchange of the vent gas streams with cold clean vent gas combined with cryogenic refrigerant, such as a cold refrigerant gas or liquid nitrogen. As the VOC-containing vent gas stream is cooled during said heat exchange, the VOCs are condensed out of the vent gas stream, separated and recovered as desired. A high degree of VOC recovery is obtained at very low levels of refrigerant utilization.

BRIEF DESCRIPTION OF THE DRAWINGS

The invention is further described herein with respect to the accompanying drawings in which.

DETAILED DESCRIPTION OF THE INVENTION

Figure 1:
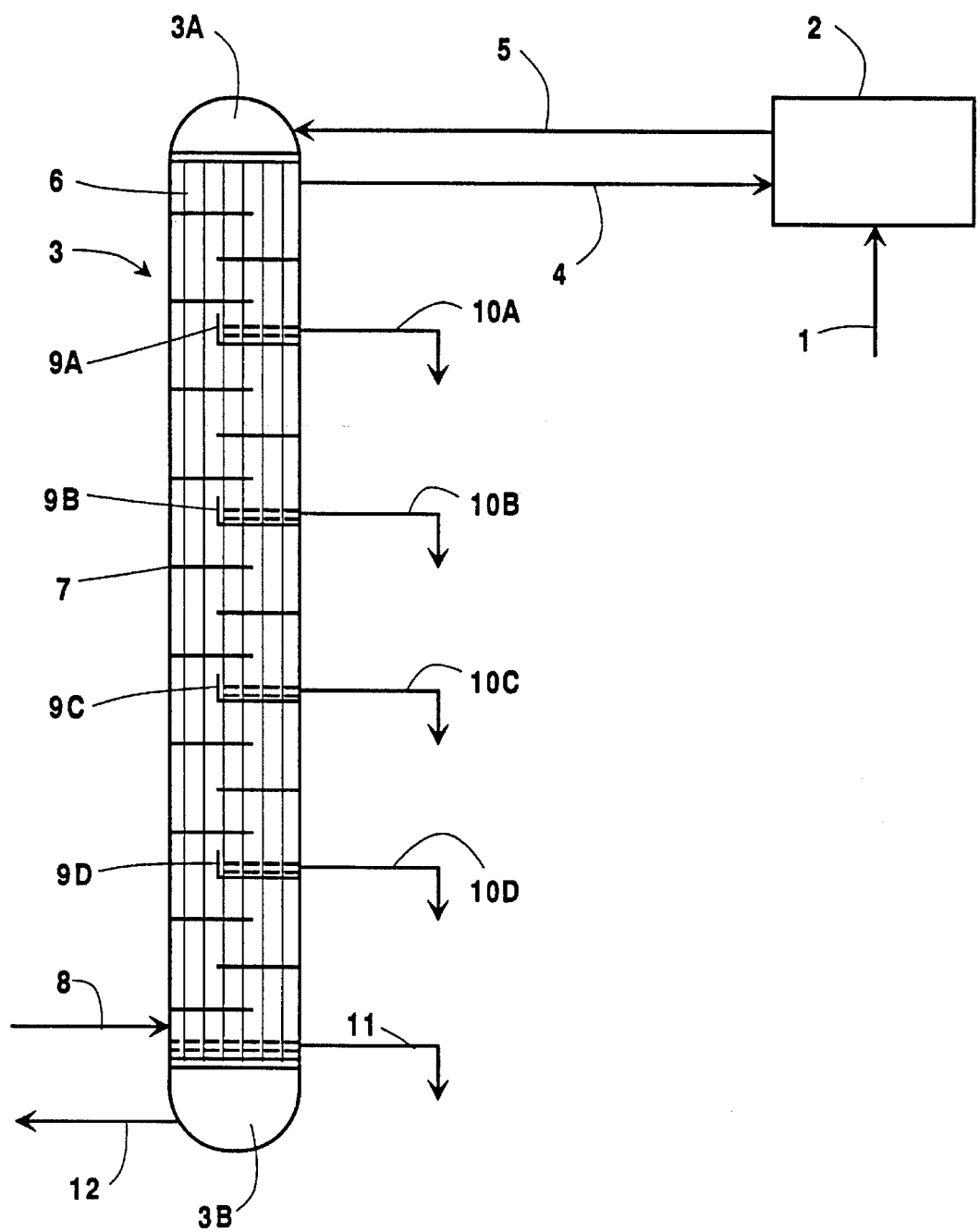
FIG. 1 is a schematic flow diagram illustrating an embodiment of the invention utilizing a vertical, continuous counter-current condenser for the desired recovery of VOCs from a vent gas stream.

The objects of the invention are accomplished by removing multiple volatiles from a vent gas stream in a continuous counter-current vent gas condenser. Volatiles and water are condensed from the vent gas at various temperatures inside the condenser to minimize freezing. The vent gas will ultimately approach cryogenic temperatures, but the condensing liquid is continuously removed before it can reach the freezing point. In a conventional tube and shell heat exchanger, the baffles can be arranged to retain the condensed liquid at various temperatures. By removing the condensed volatiles at higher temperatures, undesired freezing is minimized. For example, methanol will start to condense at below 65° C. By the time the vent gas reaches the freezing point of −98° C., most of the methanol is removed in the practice of the invention. This is because the vapor pressure of methanol is basically zero at its freezing point.

For several volatiles, such as xylene, benzene and water, the vapor present is significant even when the temperature is below their freezing point. To prevent freezing with these types of chemicals, a small amount of co-solvent with a lower freezing point will be used. For example, 1 to 5% of toluene can be incorporated into a vent gas stream saturated with benzene. The benzene has a vapor pressure of 35 mmHg at its freezing point of 5.5° C. Nevertheless, most of the benzene will be condensed and removed at its freezing point. The ratio of toluene and remaining benzene will increase at this temperature. A 50% toluene will cause a freezing point depression of 28° K. As a result, the remaining benzene can be condensed as a liquid and removed.

The invention provides a highly efficient means of recovering the refrigerant and balancing the heat load in the recovery of VOCs from vent gas streams. This is accomplished by using the cleaned vent gas as a refrigerant instead of using a second refrigerant. Since the final temperature of the condenser approaches that of the cryogenic temperature, the volatile is completely removed. Although the clean vent gas is very cold, it does not have sufficient refrigeration value for the purposes hereof due to the fact that the condensates are being continuously removed from the stream. To compensate for the difference in refrigeration value, a cryogenic fluid is added either by direct mixing or through the use of heat exchanger means.

To produce clean vent gas from one that originally contains small amounts of high boiling volatile material, the final temperature required will be far above the cryogenic temperature thereof, and thus will require only a small addition of refrigeration. Heat exchange with a cryogenic fluid may, under such circumstances, be sufficient to chill the clean vent gas closer to the cryogenic temperature.

To produce a clean vent gas from one that originally contains significant amounts of low boiling volatile material, the final temperature required for complete condensation will approach that of the cryogenic temperatures. Clean vent gas will thus require large amounts of additional refrigeration before it can, itself, serve as a refrigerant. In such instances, direct mixing of the clean vent gas with a cryogenic fluid provides the best method of adding refrigerant. The mixture of clean vent gas and vaporized cryogenic fluid thus becomes the refrigerant for the condenser.

The continuous counter-current vent gas condensation approach of the invention will thus be seen as having significant advantages over conventional batch condensation approaches. It enables substantial operating improvement to be achieved with a desirable reduction in operating cost.

Continuous Operation

The invention is adapted for continuous operation. Condensates are removed at progressively colder temperatures. Higher boiling components retrained from the warmer section are scrubbed by the condensate in the colder section. This prevents the components with high melting temperatures from becoming frozen. As a result, frequent freezing and defrosting cycles, as required in conventional batch condensation, is reduced to a minimum.

Multiple Volatile Solvent Separation and Recovery

By operating the condenser at different temperatures, the invention enables multiple volatiles to be recovered individually. Conventional batch condenser operations are limited to solvent recovery at a single temperature, resulting in mixed condensate product. The continuous condenser operation of the invention essentially fractionates the mixed volatiles into single components for separate recovery.

Higher Energy Efficiency

As is well known in the art, conventional batch condenser operations have poor energy efficiency. The frequent defrosting cycle of such batch operations demands very large amounts of refrigeration for cooling. Steam or electrical heating is also required for batch processing. By recovering most volatiles while they are still in the liquid state, the defrosting cycle has been virtually eliminated in the continuous condensation operations of the invention. It is estimated that a 90% reduction in energy consumption can be achieved in the practice of the invention.

The conventional batch condenser also exhibits poor refrigeration utilization. Refrigerant is lost either with the clean vent gas or with the spent cryogenic fluid removed from the process. Although a heat recovery unit or economizer is sometimes employed, only one refrigerant from either the clean vent gas or the spent nitrogen is recovered, but not both. As a result, one of the gases is disposed at the cryogenic temperature. In a conventional batch condenser operated at −150° C. to condense methylene chloride and water, for example, the vent gas is cleaned and exhausted at −150° C., with the spent nitrogen exhaust being at −160° C., assuming 10° C. temperature approach. A small economizer is commonly used to recover the sensible heat of the clean vent gas. To prevent freezing of water in the economizer, it is operated at 0° C. As a result, the clean vent gas is finally exhausted to the atmosphere at −20° C., assuming a 20° C. temperature approach. The spent nitrogen is still vented at −160° C.

The continuous counter-current vent gas condensation operation of the invention fully recovers the sensible heat lost to the vent gas and to the spent nitrogen. For example, vent gas at 25° C. containing methylene chloride and water is cooled as it progresses down the condenser. After knocking out the water and methylene chloride, the vent gas reaches a final temperature of −150° C. It may be continuously chilled, pending the degree of imbalance in refrigeration heat load. Liquid nitrogen is then mixed with the clean vent gas to form a refrigerant, which will lose its refrigeration capabilities as it progresses up the counter-current condenser tube. The final temperature of the refrigerant mixture can reach 20° C. (5° C. of temperature approach) before being exhausted into the atmosphere.

Minimum Mechanical and Moving Parts

The continuous counter-current vent gas condenser method of the invention uses a minimum number of the solenoid valves and blowers that are typical of conventional dual batch condensers and mechanical chillers.

Lower Capital Costs

Those skilled in the art will appreciate from the description herein that capital expenditure will basically be the cost of the modified condenser employed in the practice of the method of the invention. The total equipment cost will be compatible with, or less than, other types of VOC removal equipment, such as carbon beds and incinerators. An alternative vapor recovery unit employing a refrigerant chiller and three condensers would be more expensive and less suited for practical commercial operations.

Recovery of Pure Components

The continuous condenser method of the invention can potentially recover pure components from a saturated vent gas containing mixed volatiles. It is carried out using a condenser with substantial temperature gradients between the inlet and the outlet thereof, and means to fractionate and segregate the different volatile components being recovered. It will be appreciated that a pure component or a pure mixture will have enhanced re-sale value, or process savings, since such component(s) can be re-used directly in the upstream process from which the VOC-containing vent gas stream is obtained.

There are four major factors contributing to the overall benefits of the subject invention in practical commercial operations, namely:

(1) Continuous Recovery of Individual Volatiles at Progressively Colder Temperature Such continuous recovery is carried out using a condensation system with significant temperature gradients between the inlet and outlet of the continuous condenser unit employed. Condenser tubes may be packed with solids for use as heat sinks. This serves to reduce the condenser tube length, and the cryogenic fluid or gas is able to flow at a higher velocity, thus providing sufficient temperature gradient for the desired VOC separation and recovery. The condensing liquid is partitioned and recovered as it is condensed at various segments of the condenser before it has a change to reach the lower temperature segment of the condenser. Small amounts of entrained high boiling compound will be scrubbed by the condensate of the next colder section. This avoids the entrained high boilers from passing further into the other sections and becoming frozen. As a result, the condensed liquid subject to unnecessary freezing is minimized or even eliminated. Large quantities of liquid can be recovered at different temperatures and can be combined, if so desired, in various proportions to form desirable products. Volatiles with large differences in condensation temperature can be recovered as pure products. Conventional batch condensation methods will, to the contrary, recover all volatiles in a single stream with such desired fractionation, unless an additional condenser or condensers are employed to separately condense one or more additional components.

(2) High Energy Recovery Efficiency

Conventional processing recovers the waste refrigeration downstream of the condenser by use of an economizer or by use of a second heat exchanger positioned in the incoming VOC-containing vent gas line. The refrigeration capability of the spent cryogenic fluid is lost. The invention, on the other hand, uses the clean vent gas as the refrigerant in the main condenser. Cryogenic fluid is added to make up the difference in head load. As a result, the clean vent gas and spent cryogenic fluid can be exhausted without appreciable loss of refrigeration, at very close to room temperature or the incoming vent gas temperature.

(3) Anti-Freezing Co-Solvents

It is believed possible to condense non-ideal volatiles, i.e., those having a vapor pressure at their freezing point, using a co-solvent to depress the freezing points of such volatiles. Such non-ideal volatiles, while few, are commonly present in a variety of chemical process industries, e.g. benzene, xylene and water. As an example, one percent of toluene can be added to a saturated benzene vapor stream. Toluene has a lower freezing point than benzene, and is an ideal volatile for which the vapor pressure is zero at its freezing point. As additional quantities of benzene are condensed, the ratio of toluene to benzene increases. A 50% toluene mixture will cause a freezing point depression of 28° K. As a result, benzene can then be condensed at a temperature at least 28° K. below its normal freezing point, making it possible to achieve 100% removal of benzene from the vent gas stream. Condensed toluene is recycled back to the vent gas inlet to the condenser.

(4) Fractionation of Mixed Components

Condensation of a volatile occurs between its freezing point and its boiling point. The majority of the condensation actually occurs near the freezing point. Some overlap of the different components can occur, and result in some mixed condensate streams. Theoretically, improved separation of the components can be achieved by providing adequate reflux. In the practice of the invention, reflux is carried out by allowing the condensed low boiling mixture to be re-evaporated and re-condensed. Separation is also improved by bubbling the vent gas through the cold condensate at individual temperature segments.

It will be understood that the VOCs recovery method of the invention, and its related condenser apparatus, can be practiced with a variety of modifications and variations without departing from the scope of the invention as hereby described and claimed. Thus, the counter-current cryogenic vent gas condenser used for purposes of the invention can be built in a variety of shapes and forms. The condenser must provide sufficient travel distance for the vent gas and refrigerant so that a significant temperature gradient can be developed. Packing material may be used to facilitate such temperature gradient development. In addition, the condenser needs to include means for partitioning the condensate in the condensation zone in which it is condensed. The condenser must also be capable of removing the condensate immediately from individual temperature zones in order to prevent freezing of the condensate. An embodiment of the condenser suitable for use in the practice of the invention is illustrated in FIG. 1 of the drawings, wherein a shell and tube type condenser is provided to satisfy such requirements.

In the practice of the subject recovery method using the vertical, counter-current continuous condenser as shown in FIG. 1, a cryogenic fluid, such as liquid nitrogen, is passed in line 1 to mixing vessel 2 for mixture with clean vent gas recovered from the top of vertical, counter-current, continuous, tube and shell gas condenser 3 through line 4. A cold vent gas mixed with the cryogenic fluid is returned in line 5 from mixing vessel 2 to head space 3A at the top of gas condenser 3 for downward passage in cooling tubes 6 positioned in the cooling portion thereof. The condenser has a multiplicity of baffle members 7 positioned therein on the shell side so as to cause the vent gas being treated for VOC removal to pass upward in a tortuous path, as opposed to a direct upward flow pattern through condenser 3. As a result, enhanced contact is provided between cooling tubes 6 containing the descending cold vent gas/cryogen mixture and the ascending stream of feed vent gas containing VOCs to be removed therefrom on the shell side of said vertical condenser 3. The VOC-containing feed vent gas stream to be treated is introduced into the vertical condenser through inlet feed line 8 near the bottom of said condenser. Positioned at points along the vertical length of said condenser 3 are a number of reservoir means, i.e., 9A, 9B, 9C and 9D, adapted for the collection and removal of condensate from various components of the VOC material combined in said feed vent gas stream. Thus, said reservoir means comprise a series of condensate collecting trays having a lip section at the inner end thereof, so as to enable a quantity of a particular condensate to form and be retained without flowing downward to lower portions of the condenser column. The outer end of said condensate collecting trays 9A, 9B, 9C and 9D are illustrated in FIG. 1 as extending to the outer edge of condenser column 3 for removal therefrom of condensate through lines 10A, 10B, 10C and 10D, respectively, at locations from the upper to the lower portion of said condenser column 3. A low boiling component will thus be removed from the colder upper portion of the condenser through upper line 10A, with various other, higher boiling components being removed through lines 10B, 10C and line 10D as higher boiling components condense at lower, less cold portions of the condenser closer to feed inlet line 8. A high boiling volatile condensate is allowed to accumulate at the bottom of the effective cooling portion of the condenser for removal through line 11. Clean vent gas with spent nitrogen or other cryogen, i.e. nitrogen that has expended its refrigeration in the course of cooling the feed vent gas in the cooling portion of the condenser, is withdrawn from condenser tubes 6 into bottom head space 3B of the condenser for withdrawal therefrom through exit line 12. The clean vent gas with spent nitrogen exiting through line 12 can be exhausted to the atmosphere.

In the practice of the invention, the vent gas will thus enter the condenser from the bottom on the shell side. The vent gas can be saturated with volatiles at room temperature or about 25° C. It is cooled progressively as it passes upward through the condenser. Condensed volatiles are recovered at various levels in the condenser depending on their volatility. The reservoirs receive the condensate at various temperature zones along the length of the condenser and keep the various condensates from mixing together. The volatile with the highest boiling point or lowest volatility will be recovered first, i.e. at the lower portion of the vertical condenser, and the volatile with the lowest boiling point, or freezing point, will be recovered last, i.e. from the upper portion of the vertical condenser.

The lowest temperature of the vent gas can approach cryogenic temperature or the temperature of liquid nitrogen or other cryogenic fluid employed. For optimum operation, it is generally desirable to cool the vent gas to a final, lowest temperature of 10°–50° C. below the freezing point of the lowest boiling volatile. This will ensure that all condensables will be completely removed. The cleaned vent gas at subzero temperature can be mixed with a cryogenic fluid and used as a refrigerant for the condenser.

The cryogenic fluid is added directly to the cold cleaned vent gas removed from the top of the vertical condenser to compensate for the imbalance in heat load in the condenser. A temperature controller can conveniently be used to assure that the cryogenic fluid flow rate to mixing vessel 2 will depend on the exit temperature of the cold vent gas/cryogen mixture passing from said mixing vessel 2 to condenser 3 through line 5. The cryogenic cold gas mixture will enter the condenser tubes at the top for downward flow therein to provide refrigerant for the system. This cryogenic cold gas mixture will lose its refrigerant capability as it flows down the condenser tubes. With a desirable temperature approach of 5° C. for efficient heat transfer, the final exhaust temperature of this cold gas mixture can reach 20° C. or higher.

To provide a significant temperature gradient inside the condenser tubes, packing of solids may be added as a heat sink. This will increase the heat transfer rate to the tube before the cold gas mixture advances further down the tubes. Other methods can be used for this purpose, such as the use of finned tubes or thin film heat exchange to provide a higher heat transfer rate, providing a larger temperature gradient.

Temperatures can fluctuate inside the condenser due to variations in the flow rate of the VOC saturated vapor being treated. To stabilize the temperature, part of the exhausting clean vent gas can be recycled back to the condenser inlet based on the pressure variations encountered, with the inlet pressure being maintained by blower means.

It should be noted that there are several methods of adding refrigerant into the clean vent gas before its use as a refrigerant in the condenser. If cryogenic temperature is desirable, the clean vent gas can be bubbled through a cryogenic fluid, e.g. liquid nitrogen, to form a cold gas mixture. The heat of vaporization of the cryogen is transferred into the clean vent gas as sensible heat. For desired temperatures higher than cryogenic temperatures, it is desirable to flash off the cryogen directly into the clean vent gas to form a cold gas mixture at various desired temperatures. Similarly, if a cold gas generator is used, the clean vent gas can be blended in with the cold gas for better temperature control. Heat exchange with a cryogen in a shell and tube heat exchanger can also be employed. However, some cryogen may still be needed to compensate for the loss of condensate so that the heat load can be balanced.

Since heat is exchanged between gas phases, additional baffles should be used to increase crossflow thereof. The liquid reservoirs shown in FIG. 1 are desirably used in place of conventional baffles in preferred embodiments of the invention so that a physical partition is formed to prevent mixing of separate condensates. Liquid is drained from the condenser and is collected as individual condensate products. Reflux can be controlled by enabling limited amounts of condensate to drip or flow through a line into the gas stream of the lower baffle. Co-solvent, such as toluene, is re-evaporated and returned to the condenser unit.

It will be understood that, in the practice of the invention, a variety of other condenser configurations can be used to practice the method of the invention for the continuous, counter-current condensation to condense volatiles at various temperatures inside the condenser and to avoid undesired freezing therein.

Figure 2:
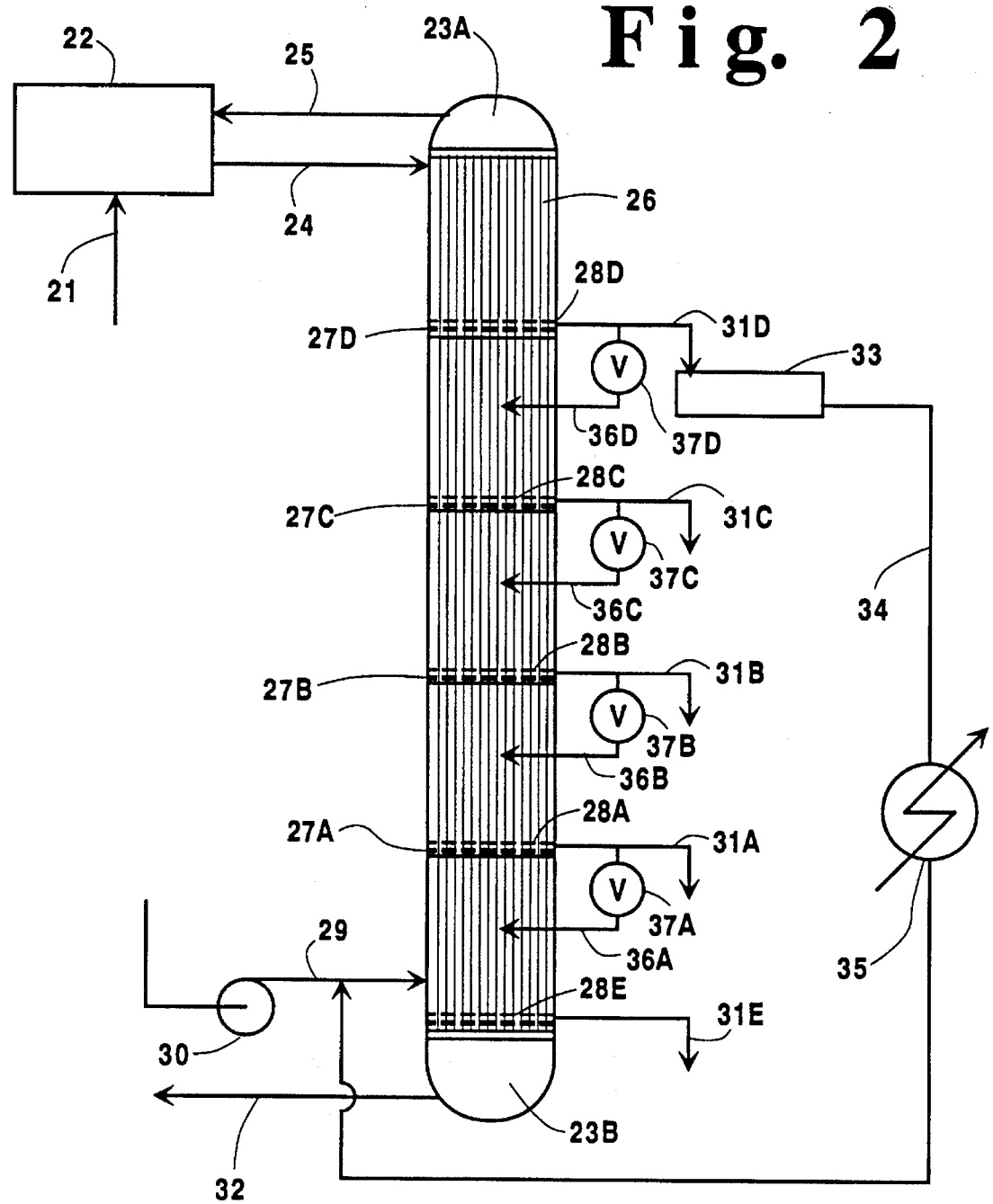
FIG. 2 is a schematic representation of another embodiment of the invention utilizing a vertical, continuous counter-current condenser for the desired recovery of VOCs from a vent gas stream.

In a highly desirable alternative embodiment of the vertical, counter-current continuous condenser of the invention, sieve trays for the bubbling of gas upward through liquid are used in place of the modified baffle means described above with reference to the FIG. 1 embodiment. In this latter embodiment, illustrated in FIG. 2 of the drawings, condensate liquid is retained to a higher level, and the upwardly flowing vent gas must bubble through the condensate liquid before coming into contact with the next upper section of condenser tubes. This next section of condenser tubes has a lower temperature than the liquid collected on top of the sieve tray. By direct contact of the vent gas with the chilled liquid of an upper sieve tray, trace amounts of lower boiling organic material will be condensed before contact with the colder walls of the condenser tubes. Freezing due to entrainment will thereby be minimized. Higher boiling component condensed with the liquid will be re-evaporated when the vent gas bubbles pass by, resulting in internal reflux and better separation of the VOC components. In said FIG. 2 embodiment, a cryogenic fluid, such as liquid nitrogen, is passed in line 21 to mixing vessel 22 for mixture with clean vent gas recovered from the top of vertical, counter-current, continuous, tube and shell gas condenser 23 through line 24. A cold vent gas mixed with cryogenic fluid is returned in line 25 from mixing vessel 22 to head space 23A at the top of gas condenser 23 for downward passage in cooling tubes 26 positioned in the cooling portion of said condenser. The condenser has a number of sieve trays, i.e., from the bottom to the top, sieve trays 27A, 27B, 27C and 27D, respectively, positioned therein in the shell side and adapted to retain a desired level of condensate liquid, i.e., 28A, 28B, 28C and 28D, respectively, and to allow vent gas from below to pass through openings therein so as to bubble through said condensate liquid retained on said trays. Contact is thereby provided for an ascending feed vent gas, containing VOC's to be removed therefrom, on the shell side with condensed VOC material retained on the sieve trays at different temperatures, and the descending cold vent gas/cryogen mixture in cooling tubes 26. The VOC-containing feed vent gas stream to be treated is passed through feed inlet line 29 containing blower 30 near the bottom of the cooling portion of the condenser. Condensate is removed from condenser 23 at the various levels of condensate retention, with co-condensate material, e.g., co-solvent, being removed from condensate liquid level 28D through line 31D, with low boiling, most volatile remaining component being removed from condensate liquid level 28C through line 31C, and other condensate liquid being removed from condensate liquid levels 28B and 28A through lines 31B and 31A, respectively. A high boiling, less volatile condensate is allowed to accumulate at the bottom of the cooling portion of condenser 23, Iee., at condensate liquid level 28E, for removal through line 31E. Clean vent gas with spent nitrogen or other cryogen is withdrawn from condenser tubes 26 into bottom head space 23B for withdrawal from the condenser through exit line 32. Co-condensate material is desirably passed in line 31D to co-condensate tank 33, from which it can be recycled in line 34 containing evaporator 35 for introduction into the lower portion of condenser 23 with additional quantities of VOC-containing feed vent gas in line 29. For desirable reflux purposes, apart from the internal reflux referred to above, a portion of the condensate liquid removed from the condenser through lines 31A, 31B, 31C and 31D can be passed through lines 36A containing valve 37A, line 36B containing valve 37B, line 36C containing valve 37C, and line 36D containing valve 37D, respectively, for recycle to the next lower portion of condenser 23 below the sieve tray from which the condensate liquid is removed, i.e., below sieve trays 27A, 27B, 27C and 27D, respectively.

As indicated above, other types of condenser configuration, such as fins and frame units, can be employed in the practice of the invention. Thus, there are no limits on type and shape of condenser employed, so long as the condenser provides the function of partitioning the condensed volatile, precludes entrainment of condensed droplets, provides reflux and enables the condensate to be collected at multiple temperature zones. Horizontal condensers can be used with partitions on the shell side formed by the use of packing material, such as glass or metal wool, instead of by the use of baffles. In such horizontal configurations, condensed volatiles removed from the vent gas can be collected at separate collection points along the horizontal length for separate withdrawal. Numbers of external pumps are needed when using such configurations, however, in order to provide desirable internal reflux.

Based on the condenser configuration illustrated in FIG. 1, the following results have been determined for a representative VOC removal and recovery application using a typical vent gas stream:

| Inlet Conditions: | |
| --- | --- |
| Inlet temperature | 100° F. |
| Pressure | 15 psia |
| Enthalpy | 615,610 Btu/hr |

-continued

| Compositions | |
|---|---|
| Methylene chloride | 15.54 lb/hr |
| Tichloromethane | 12.29 lb/hr |
| Water vapor | 64.16 lb/hr |
| Air | 4,479.68 lb/hr |
| Total Mass Flow | 4,571.67 lb/hr |
| Outlet Conditions | |
| Outlet temperature | 94.5° F. |
| Volatile content | 0% |
| Enthalpy | 657,584 Btu/hr |

To recover 100% of the condensate, 308.14 lb/hr or cryogenic liquid nitrogen (at −320° F.) is used in direct mixing with the clean vent gas from the condenser. No freezing of volatiles is observed. The liquid nitrogen consumption is only a fraction of what conventional batch condensers consume. A typical cryogenic batch condenser has been found to require 2,263 lb/hr of liquid nitrogen.

Figure 3:
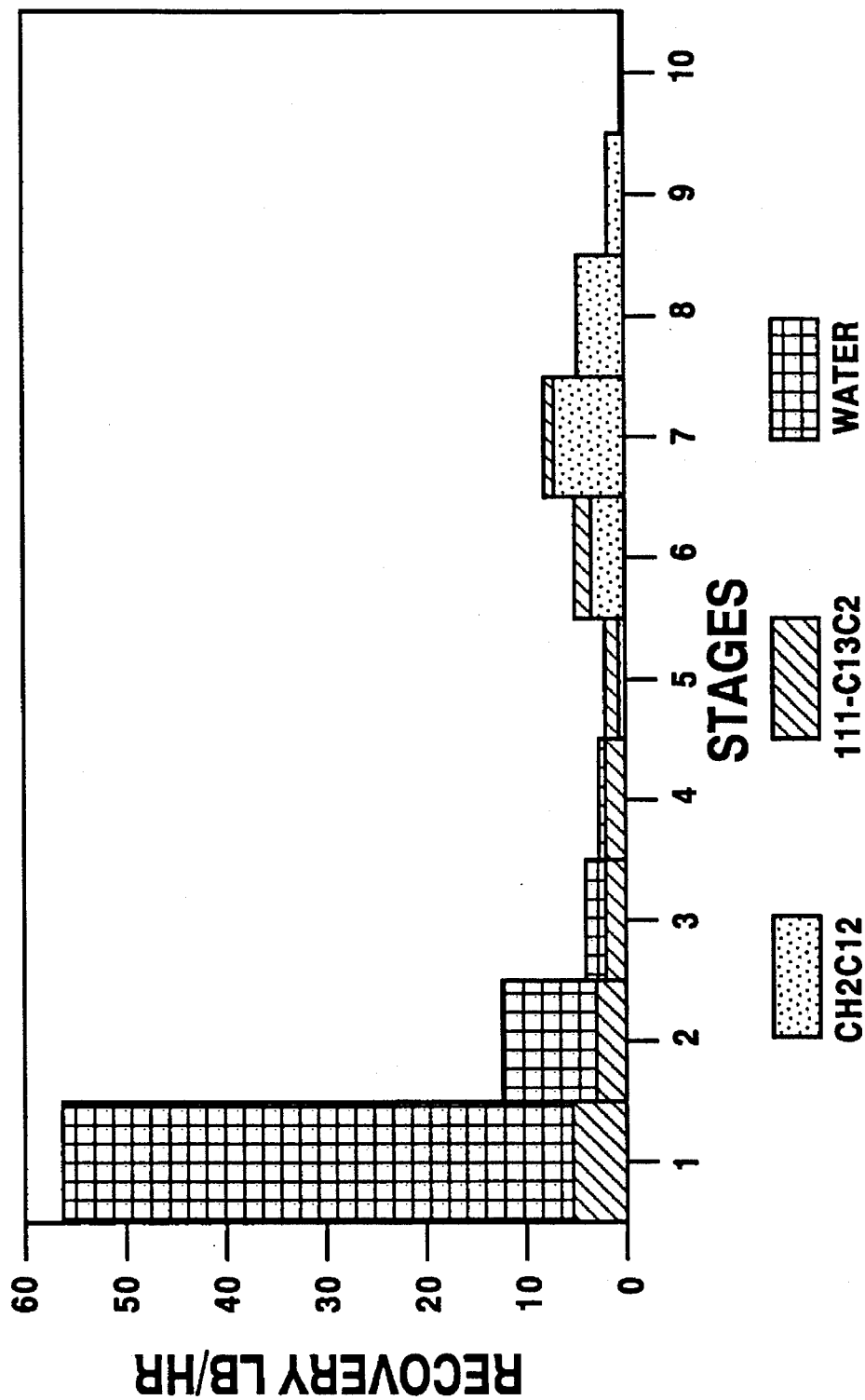
FIG. 3 is a graphical representation of the recovery of volatile methylene chloride from a vent gas stream using the continuous counter-current condenser of FIG. 1 in the practice of the invention.

FIG. 3 of the drawing illustrates the recovery of methylene chloride from a vent gas stream using the counter-current continuous condenser of FIG. 1. The condenser used in the example had ten condensed liquid collection ports. No reflux was employed, but pure methylene chloride was recovered from a water-methylene chloride mixture. Further reflux and separation would be required in order to recover 111-trichloromethane as a separate condensation product.

It will be appreciated that an alternative method for achieving a similar separation would involve the use of multiple batch condensers. For example, ten different condensers, each operating at a different temperature, would be needed to recover the liquid in ten stages as shown in said FIG. 3. In such processing, freezing would still be a problem, since there are no temperature gradients inside individual batch condensers.

The invention provides a highly advantageous method for recovering volatile organic compounds from vent gas streams. It constitutes a substantial improvement over prior techniques, enabling simplified apparatus to be employed and enabling multiple organic volatiles to be separately recovered from vent gas streams.

I claim:

1. A process for the recovery of volatile organic compounds from a vent gas stream comprising:
   (a) passing a feed vent gas stream containing volatile organic compounds continuously to a first end of a condenser vessel for passage therethrough;
   (b) withdrawing clean vent gas continuously from a second end of the condenser vessel;
   (c) mixing said clean vent gas with a cryogenic fluid to produce a refrigerant stream at a desired temperature level;
   (d) passing said refrigerant stream to said second end of the condenser vessel for passage therethrough, in refrigerant tubes, counter-current to the passage of said vent gas stream containing volatile organic compounds;
   (e) separately collecting volatile organic compound condensates at different temperature levels within the condenser vessel;
   (f) separately removing the separate volatile organic compound condensates from the condenser vessel; and
   (g) removing clean vent gas and spent cryogenic fluid continuously from said first end of the condenser vessel, whereby volatile organic compounds are separately condensed, removed and recovered from a vent gas stream at desirably low cryogenic fluid utilization, without undesired freezing of any components of the feed vent gas stream within the condenser.

2. The process of claim 1 in which the clean vent gas and spent cryogenic fluid are removed from said first end of the condenser vessel at a temperature close to the temperature of the feed vent gas stream passed to said condenser vessel.

3. The process of claim 1 in which the feed vent gas stream is passed to the lower end of a vertical shell and tube condenser vessel for ascending passage therethrough on the shell side, with the refrigerant stream being passed to the upper end thereof for descending passage therethrough on the tube side in continuous, counter-current flow with respect to the flow of said feed vent gas stream.

4. The process of claim 3 in which the refrigerant stream is passed through said refrigerant tube having means to enhance the temperature gradient within such refrigerant tubes.

5. The process of claim 4 in which said refrigerant tubes are packed with solids to form a heat sink enhancing the temperature gradient within said refrigerant tubes.

6. The process of claim 3 in which the feed vent gas stream is passed upward through a tortuous path in the vertical condenser vessel.

7. The process of claim 6 in which condensates of said volatile organic compounds are separately collected in reservoirs positioned at various temperature levels in said condenser vessel, with the separately collected condensates being separately recovered from the condenser vessels at said temperature levels.

8. The process of claim 7 in which sieve trays are positioned on the shell side of the condenser vessel at various temperature levels, said separately collected condensates being retained on said sieve trays.

9. The process of claim 1 in which the feed vent gas stream contains a volatile organic compound, or water, having a significant vapor pressure at temperatures below the freezing point thereof, and including a small quantity of co-solvent having a lower freezing point than said volatile organic compound, or water, to enable all of said volatile organic compound or water to be condensed as a liquid for removal from the condenser vessel without freezing therein.

10. The process of claim 9 in which said volatile organic compound is p-xylene or benzene.

11. The process of claim 10 in which said volatile organic compound is benzene, with about 1% to about 5% of toluene being added to said feed vent gas stream as said co-solvent to enable all of the benzene to be condensed as a liquid.

* * * * *